United States Patent [19]
Bernhardt

[11] 3,713,738
[45] Jan. 30, 1973

[54] METHOD AND APPARATUS FOR RAPIDLY AND SELECTIVELY DETERMINING PURITY OF PROCESS STREAMS

[75] Inventor: Walter O. Bernhardt, Woodland, Calif.

[73] Assignee: Beet Sugar Development Foundation, Ft. Collins, Colo.

[22] Filed: July 8, 1971

[21] Appl. No.: 160,767

[52] U.S. Cl. ............... 356/73, 250/218, 250/225, 356/116, 356/128
[51] Int. Cl. ................. G01n 21/44, G01n 21/46
[58] Field of Search....356/36, 72, 73, 114, 116, 117, 356/128-137, 181, 244; 250/218, 225

[56] References Cited

UNITED STATES PATENTS

| | | | |
|---|---|---|---|
| 3,609,324 | 9/1971 | Machler et al. | 356/73 |
| 3,511,573 | 5/1970 | Isreeli | 356/244 X |
| 3,411,342 | 11/1968 | Liermann | 356/72 X |
| 3,468,607 | 9/1969 | Sloane et al. | 356/73 |

Primary Examiner—Ronald L. Wibert
Assistant Examiner—F. L. Evans
Attorney—Flehr, Hohbach, Test, Albritton & Herbert

[57] ABSTRACT

System (method and apparatus) for rapidly and selectively determining the "purity" (i.e., ratio of dissolved sucrose to total solids) in multiple process streams. The system employs control mechanisms in conjunction with a generally closed circulatory system to automatically perform all necessary operations for successive purity determinations with respect to a plurality of process streams to be measured, including: preparation of the circulating sample of selected solids concentration, maintenance of the temperature of the circulating sample within a relatively narrow range as respects a predetermined control temperature, automatic polarimetric and refractometric measurement of the concentrations of sucrose and total solids in the circulating sample, and conversion of the polarimetric and refractometric measurements to an indication of the desired sucrose purity ratio. The system specifically operates to provide an automatic purity readout only at such time as the circulating sample is substantially at the predetermined control temperature and desired solids concentration, thus insuring reproducibility of results.

24 Claims, 4 Drawing Figures

INVENTOR.
Walter O. Bernhardt

METHOD AND APPARATUS FOR RAPIDLY AND SELECTIVELY DETERMINING PURITY OF PROCESS STREAMS

BACKGROUND OF THE INVENTION

In the food processing industry generally, and in the sugar industry particularly, it is important to know the proportion of the sucrose in process streams containing dissolved sucrose and other solids. Thus, in the sugar industry, the term "purity" is used to denote the percentage ratio of dissolved sugar (sucrose) to total dissolved solid constituents.[1] ([1]See "Beet-Sugar Technology" by R. A. McGinnis, Reinhold Publishing Corporation, 1951, page 30) The determination of the purity of process streams undergoing purification or refinement is of utmost importance to the sugar processor, to both insure effective control of the process and a maximum purity increase at each processing step. Accurate determination of purity is also important in the discarding or recycling of materials at optimum levels of purity.

In the past, the purity ratio has been determined in the laboratory by analyses designed to estimate the dissolved sucrose and total dissolved solids. In such procedures, the total solids estimation is made by a measurement of either density or refractive index of the solution, and converting the measurement to solids concentration. The sucrose estimation is made by a measurement of the angular rotation of plane polarized light by the solution in a polarimeter, under specified conditions of temperature, path length through the solution, and wave length of the illuminant. The angular rotation is then converted to sucrose concentration. Purity can be calculated from the data to total solids and sucrose concentrations, by slide rule or with the aid of tables.

Laboratory analyses of the type described are customarily difficult to perform because factory process streams are dark viscous liquids which cannot be analyzed on manual polarimeters or saccharimeters without treatment for color reduction. It is therefore customary to clarify and reduce coloration by addition of dry basic lead acetate and subsequent filtration. Moreover, as the concentration of most process streams is too high for analysis in the laboratory instruments employed, dilution with water is required prior to analysis. Further, since the analysis instruments are calibrated for use at specific temperatures (e.g., 20° or 25°C) whereas the process streams are usually at much higher temperatures (e.g., 80° to 100°C), substantial cooling of the diluted process sample is required. As a consequence, purity analyses in the laboratory are both tedious and time consuming.

Although continuously operating apparatus to determine the estimated extraction potential of a single process stream containing sucrose has been recently described (see Sloane et al U.S. Pat. No. 3,468,607), such apparatus is neither effective nor intended to successively measure the purity of several process streams in a factory operation. Accordingly, the development of an efficient, selective, easily controlled system for rapidly determining the purity of multiple process streams containing sucrose is greatly to be desired.

SUMMARY OF INVENTION AND OBJECTS

The present invention relates, generally, to methods and apparatus for the rapid selective purity analyses of process streams containing dissolved sucrose, and more particularly, to methods and means making possible the accurate and reproducible determination of the purity of such process streams at known predetermined temperature and concentration.

Broadly, the method of the present invention involves several general operations or phases: First, a dilute sample of a selected process stream is prepared and caused to circulate in a generally closed circulatory path by a sequence involving draining, washing and filling of the circulatory path with pure water and thereafter adding portions of the selected process stream to the water to form a circulating sample of progressively increasing solids concentration. Next (and simultaneously), the temperature of the circulating sample is controlled with respect to a predetermined control temperature whereby the temperature of the sample is caused to oscillate within a relatively narrow range extending above, below and through the control point. In a subsequent phase or operation, simultaneous refractometric and polarimetric measurements are initiated with respect to the circulating sample to generate electrical signals which are proportional, respectively, to the total solids concentration and the sucrose concentration of the circulating sample. Finally, the refractometric and polarimetric electrical signals are converted to a sucrose purity ratio for recording or display, such conversion taking place only at such time as the circulating sample has both increased in solids concentration to a desired value (e.g., 11° or 22° Brix) and its temperature has oscillated through the predetermined control temperature (e.g., 50°C). As noted above, causing the purity reading to be obtained only at a known sample temperature and concentration insures accuracy and reproducibility at each purity determination.

The foregoing broad processing, is of course, subject to variation. Thus, the precise solids concentration and the particular control temperature at which the purity reading is obtained may be varied to conform to particular process materials. Also, assuming industrial applications of the method in the analysis of large numbers of process streams, the control sequence or program for the analyses may be subject to wide variations to achieve desired results. In general, however, in multi-stream analyses, it has been found desirable to program samples for analysis at relatively short periods of time, ranging from about 3 to no more than about 5 minute intervals, so that each process stream will be repeatedly analyzed at an appropriate interval. Thus, in the case of ten sample streams, and a program for analysis every three minutes, each sample would be analyzed once every half hour.

Apparatus for carrying out the foregoing method provides means for forming a generally closed circulatory system and means introducing substantially pure water together with sample portions of process liquids to the system, to cause a sample of progressively increasing solids concentration to be formed and to circulate within the system. The apparatus additionally includes means to control the temperature of the liquid circulating within the system to within a predetermined range as respects the control temperature, and refractometric and polarimetric means in fluid communication with the circulating sample to provide electrical signals which are proportional, respectively, to the concentration of total solids and sucrose in the circulating sample. The apparatus additionally includes indicating means responsive to said proportional electrical signals to indicate the purity ratio of sucrose to total solids, together with cooperating control means (viz., program timer, relay logic, computer-recorder) to insure that the purity read out occurs only at a predetermined control temperature and solids concentration of the circulating sample. In general, as noted above, the purity apparatus of the invention functions to rapidly and selectively analyze a relatively large number of sucrose containing process streams in a relatively short period of time. Accordingly, to accomplish such result, the apparatus includes such devices as multi-point recorders, with facilities for programmed selection of samples of process streams, print out of sample displays in conjunction with identification symbols, colors, numerals or letters, and initiation of process stream analyses in desired programmed sequence.

It is a general object of the present invention, therefore, to provide a method and means for the rapid selective determination of the purity of process streams containing sucrose, wherein a multiplicity of such process streams are analyzed rapidly and intermittently on a sequential basis.

A further general object of the invention is to provide rapid sequential purity analyses of the character described, wherein each purity analysis is related to a dilute circulating sample of known predetermined concentration and temperature.

Still another object of the invention is to provide an improved method and means of such character that is adaptable to virtually any food processing operation wherein sugar is present in the form of a continuously flowing solution stream of unknown sucrose concentration.

Another object of the invention is to provide an improved system of apparatus for such purpose.

Additional objects and advantages of the invention will appear from the following description in which a preferred embodiment has been set forth in detail in conjunction with the accompanying drawing.

DESCRIPTION OF PREFERRED EMBODIMENTS

Figure 1:
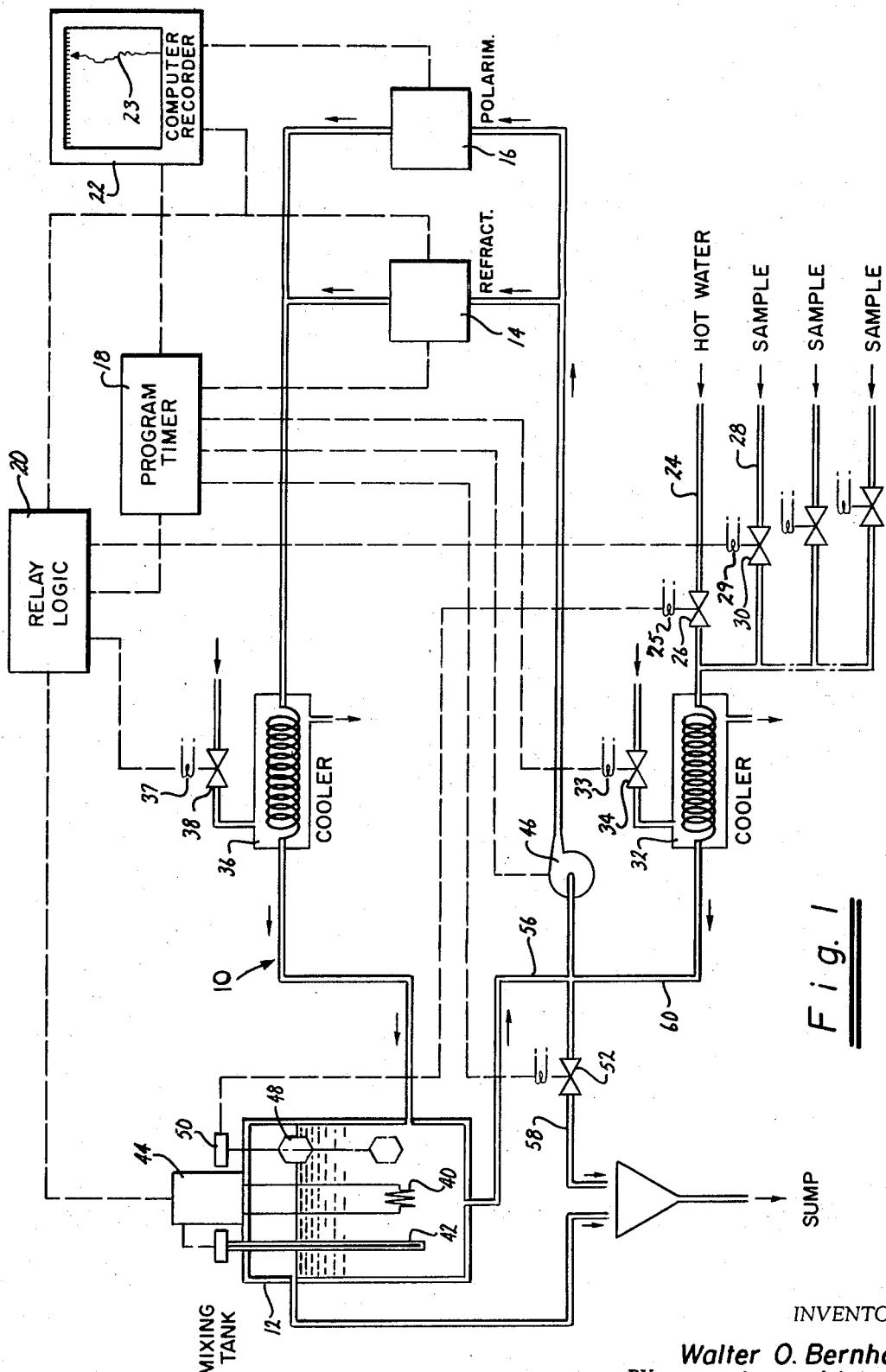
FIG. 1 is a schematic representation of apparatus for selectively determining the purity of multiple process streams, in accordance with the present invention.

FIG. 1 schematically illustrates the flow of process materials to the purity analyzer and the basic components of the apparatus. These basic components comprise : a generally closed circulatory system 10 wherein samples prepared in a mixing tank 12 are circulated through an automatically operated refractometer 14 and polarimeter 16; a program timer 18 to control the overall operation of the purity analyzer; a relay logic 20 to control particular aspects of the purity analysis; and a purity computer and recorder 22.

Clear water is introduced to the system through line 24 under the control of the control valve means 25–26. Portions of process streams to be sampled and analyzed are selectively introduced through the inlet lines 28 under control of associated control-valve means 29–30. As previously noted, the admissions of dilution water and sample materials through lines 24 and 28 are automatically controlled by the program timer and relay logic units so as to insure an automatic purity readout only at such time as both a predetermined sample concentration and temperature have been reached. Temperature control means for such purpose (also under the control of the program timer and relay logic) include an inlet cooler 32 together with control-valve means 33–34, a circulatory cooler 36 together with control-valve means 37–38, and heat exchange means in the mixing tank including a heating element 40 and an associated temperature sensor 42 and heater control 44. The analyzer apparatus additionally includes pump means 46 to circulate sample liquids through the closed circulatory system 10, a float control 48 and associated switch means 50 to initially control the volume or level of liquid in mixing tank 12, and a drain valve 52 to permit periodic discharge of analyzed samples to the sump. The switch 50 also functions to de-energize the heater 40 when the liquid level is below the heating coil.

The method of analysis as well as the operation of the apparatus can best be described with reference to a typical analysis cycle. Such cycle, involving initial purging of the apparatus, dilution of the sample to a desired solids concentration, thermal control of the sample with respect to a predetermined control temperature, and controlled initiation of polarimetric and refractometric measurements to obtain the desired purity readout only at a known condition of temperature and concentration of the sample, is described below.

Purging of the Apparatus

The system of apparatus is subjected to a timed draining and washing sequence under the control of the program timer 18. The purpose of this timed sequence is to purge the system of the previous sample.

Referring to FIG. 1, the program timer 18 initially functions to stop the pump 46 and to open the drain valve 52 so that the previous sample within the circulatory system 10 and mixing tank 12 is discharged through the lines 56 and 58 to the sump. After the system has been drained, the timer 18 functions to open the water inlet valve 26 to introduce water to the system. At the same time, the timer 18 restarts the circulating pump 46. During this stage of the purge cycle, the drain valve 52 remains open with the result that hot wash water is rapidly circulated through the inlet feed line 60, circulatory system 10, mixing tank 12, and lines 56 and 58 leading to the sump. During this wash cycle, the hot water also serves to flush the pump 46 and the fluid lines of the refractometer 14, the polarimeter 16, and the coolers 32 and 36. The washing sequence is continued for a sufficient period of time to thoroughly purge the system of a previous sample.

Following the wash cycle, the timer 18 functions to close the drain valve 52 so that the circulatory system 10 and mixing tank 12 fill with hot water to a level determined by the float control 48. At the desired level, the float actuates the switch 50, causing the relay 25 to close valve 26 and shut off the hot water supply.

In general, the temperature of the water introduced through the valve 26 will approximate the temperature at which the sample is to be prepared. Thus, if the desired control temperature is, say, 50°C, the inlet water temperature will approximate 50°C. The temperature of the entering water is not critical to the process, however, since precise temperature control is provided by the various heat exchange units, under the control of the program timer and relay logic, as hereinafter described.

Sample Preparation

As noted above, the drain wash and water fill cycles are controlled by the program timer 18 and float switch 50. Subsequent operations to prepare a circulating sample of predetermined solids concentration and controlled temperature are carried out through combined operations of the program timer 18 and relay logic 20.

The program timer 18 can be of conventional design, and generally employs a series of rotary cam switches rotated by a timer motor 19. The first three cam switches (not shown) operate routinely to initiate the draining, flushing and water fill operations just described. The fourth cam switch (illustrated at 62 in FIG. 2) operates to interrupt the circuit for the timer motor and to initiate operation of various relays and circuits of the relay logic 20 (see FIG. 2), to effect preparation of a circulating sample of known predetermined solids concentration and temperature. This general operating sequence is described below.

Figure 2:
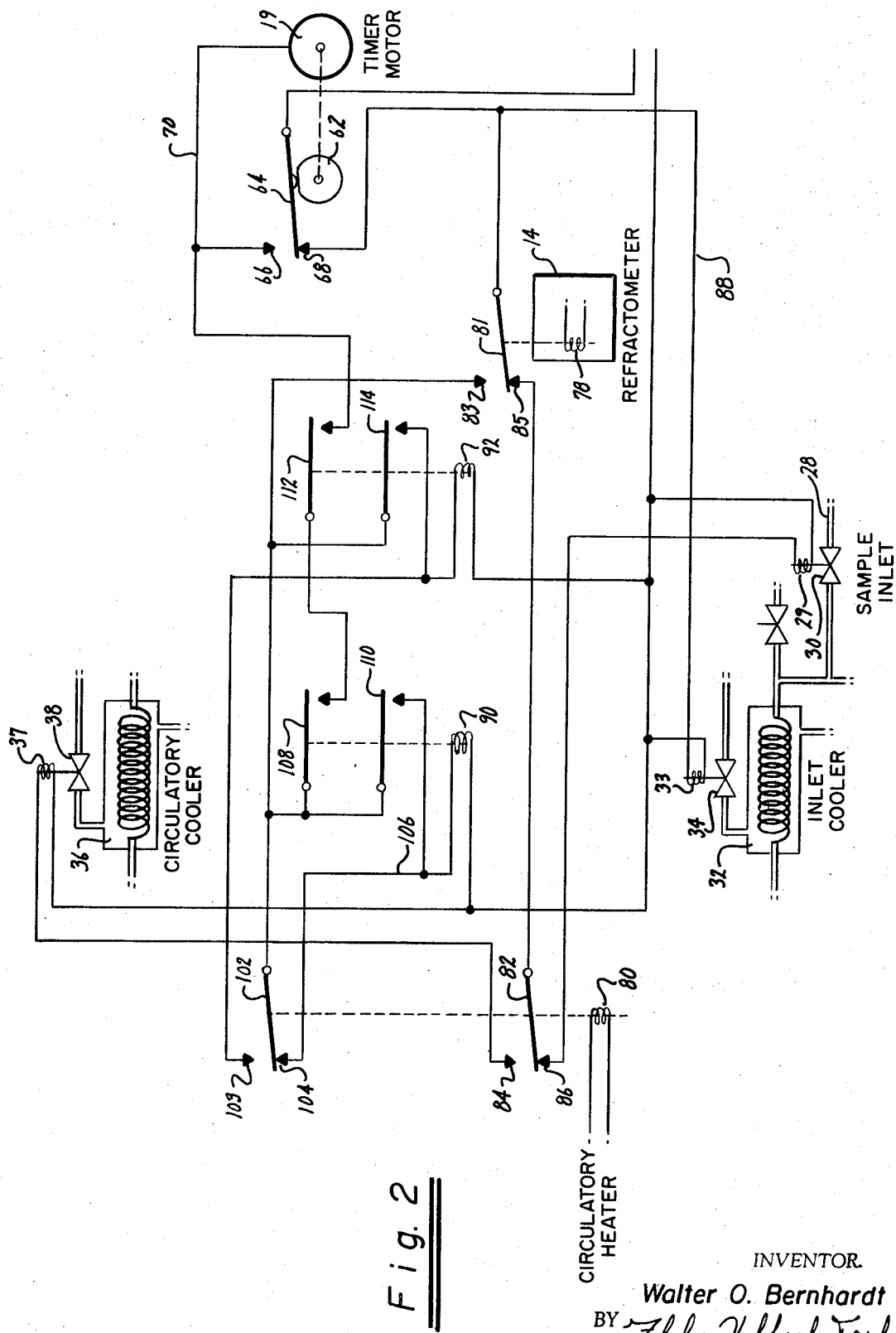
FIG. 2 is a schematic representation of a relay logic circuit useful with the apparatus of FIG. 1.

Referring to FIG. 2, operation of the timer motor 19 to rotate cam 62 to the position illustrated, causes switch 64 to shift from a normal position at contact 66 to contact 68. The shifting of switch 64 interrupts the circuit through line 70 to the timer motor and simultaneously energizes control 33 of cooling water valve 34 and switch 81 of refractometer relay 78 to energize a control 29 (through switch 82) to selectively open a desired control valve 30. The refractometer relay 78 connects switch 81 to contact 85 while the concentration of the circulating sample is below the control point. On reaching or exceeding the control point, relay 78 connects switch 81 to contact 83, as hereinafter described.

In general, the relay logic circuit (as schematically illustrated in FIG. 2) functions to control the introduction of sample liquid through the selected valve 30, in the preparation of a circulating sample of predetermined solids concentration, and to establish and maintain optimum temperature conditions for a subsequent automatic sucrose purity analysis of the circulating sample. More specifically, the relay logic circuit controls the operations of various relays, which control the operations of circulatory heat exchange units, including the cooler 36 and heater 40, and the particular sample valve 30 through which the sample liquid is being introduced. Thus as previously noted, it is desirable that the sample circulating in the closed system be maintained within a relatively narrow temperature range as respects a predetermined control temperature. For example, during the operations to initially prepare a dilute sample of known concentration, it is desirable to maintain the temperature of the circulating sample within a relatively narrow range from about +1° to −1° C as respects the control temperature. On the other hand, during the critical period of purity analysis as hereinafter described, the temperature of the circulating sample is preferably maintained within a much narrower temperature (i.e., within about +0.05° to −0.05° C).

In the case of sugar factory juices, where process streams are normally at elevated temperatures, the temperature of the incoming sample may vary between 80° and 90°C. In such circumstances, and assuming a control temperature of about 50°C, temperature control can be obtained by alternatively introducing hot sample material through the valve 30, followed by operations of the cooler 36 and heater 40 to reduce and maintain the temperature of the circulating sample within the desired temperature range. In like fashion, where the temperature of the entering sample liquid is below the control temperature, the heater 40 and cooler 36 can be operated in such fashion as to initially increase and thereafter maintain the temperature of the sample within the desired range.

As a matter of convenience, the following description assumes the introduction of a sample liquid at a temperature substantially above the control temperature. However, regardless of the inlet temperature of the sample, the intermittent introductions of sample liquid to the system 10 through valve 30 will achieve a progressively increasing solids concentration of the circulating sample, until such time as the solids concentration desired at the moment of purity reading has been reached.

Referring again to FIG. 2, and assuming a position of the cam 62 to effect deactivation of the timer motor 19 and activation of switch 81 of the refractometer relay 78, the sample inlet valve 30 is energized (through switch 82) and remains open until sufficient hot sample has been introduced to raise the solution temperature above the control point. When this occurs, the sensor 42 in tank 12 activates the heater control 44 to de-energize a relay 80 connected across the coil of the heating element 40. De-energizing the relay 80 causes the switch 82 to shift to contact 84, to open control-valve 37–38 for the cooler 36 in the circulatory system 10. When the temperature of the circulating sample drops below the control point, the heater control 44 operates to re-energize the relay 80 to activate the heating element 40 and, simultaneously, to close the control-valve 37–38 for the cooler 36, by shifting the switch 82 to contact 86. In the latter position, the sample valve 30 is again opened to introduce hot sample liquid to the system. The described alternating introductions of sample liquid through valve 30, and cooling water through valve 38 to the circulatory cooler 37 (under thermostatic regulation by the heater-control 40–44) maintains the temperature of the circulating sample liquid close to the control temperature (viz., 50°C), thereby preventing excessive temperature differences between the circulating sample and the optical surfaces of the refractometer and polarimeter 16.

Additional temperature control is obtained during intake of sample liquid by operation of the inlet cooler 32. Thus as specifically illustrated in FIG. 2, switch 64 operates through contact 68 to energize the control-valve 33-34 for the inlet cooler 32. The resultant admission of cold water to the cooler 32 effects heat exchange with the liquid in line 60, to lower the temperature of the incoming sample. By way of illustration, and assuming a control temperature of 50°C and a sample inlet temperature of 80° to 90°C, the sample may be cooled in the cooler 32 to an inlet temperature of the order of 55° to 60°C, facilitating more effective temperature control within the circulatory system 10.

As will be apparent from the foregoing, the progressive introduction of sample liquid to the circulatory system 10, through the selected inlet line 28 and valve 30, causes a progressive increase in the solids concentration of the circulating sample. After a number of sample admissions, the solids concentration of the circulating sample increases to a desired predetermined point, as measured by the refractometer 14. When the selected solution concentration has been reached, the refractometer relay 78 is de-energized causing switch 81 to shift from its normal position at contact 85 to position 83. In its new position, switch 81 energizes the relays 90 and 92 through lines 94 and 96 to prevent operation of the timer motor 19 until such time as the temperature of the circulating sample subsequently passes through the predetermined control point (either by rising or falling), as follows:

If the temperature of the circulating sample is below the control point, at the instant of release of the refractometer relay 78, current flows through switch 102 of the heater relay 80 to contact point 104 and through line 106 to the relay 90. This activates switches 108 and 110 to close both of the circuits of the relay 90. The closing of switch 110 functions to latch the relay, whereas the closing of switch 108 functions to energize switch 112 of relay 92. When the control temperature is reached (on the rise), relay 80 is de-energized and switch 102 moves to contact 103, energizing relay 92. When this occurs, switch 112 supplies current to the timer motor and switch 114 (which is also closed) latches the relay 92. Rotation of the timer motor causes the cam 62 to rotate to move switch 64 from contact 68 to contact 66, re-establishing the current path to the timer motor. The shifting of switch 64 also breaks the circuits to relays 90 and 92, causing them to open.

If the temperature of the circulating sample is above the control point at the instant of release of refractometer relay 78, relay 92 is energized and latched first. However, the timer motor is not energized because the heater relay 80 is still de-energized so that the relay 90 is still open. Accordingly, when the temperature of the circulating sample drops below the control point, relay 80 is energized, causing relay 90 to close and complete the current path to the timer motor in the manner previously described. Reactivation of the timer motor re-establishes the current path through switch 64 and line 70, by movement of the cam 62. Shifting of switch 64 reopens the relays 90 and 92, as before.

Should the temperature of the circulating liquid be higher than the control temperature, when switch 64 is shifted by cam 62 to initiate sample inflow, valve 38 for the circulatory cooler 36 is open, due to the fact that the heater relay is de-energized until such time as the sample temperature is below the control point. When the temperature has fallen below the control point, heater relay 80 becomes energized to shift switch 82 to contact 84, at which point the cold water valve 38 is closed.

In summary, and with illustrative reference to analysis of hot sugar factory juices, when the cam 62 energizes the refractometer 78 at a time when the sample solution is below 50°C, the sample valve 30 is opened, causing hot liquid sample to be introduced to the suction side of the pump 46, where it mixes with the contents of the tank 12 and circulates through the circulatory analysis system 10. During the intake of the sample, the cold water valve 34 is also open so that the sample is cooled while passing through the cooler 32, from an incoming temperature of, say, 80° to 90°C to a mixing temperature of about 55° to 60°C. As a result, the temperature of the circulating sample soon rises above 50°C. When the temperature exceeds 50°C, the heater relay 80 closes the sample valve 30 and opens the cold water valve 38 to cool the circulating sample to a temperature below 50°C. This, in turn, causes closure of the cooling valve 38 and opening of the sample valve 30. The alternating admissions of hot sample to the circulatory system 10 and cooling water to the circulatory cooler 32, under thermostatic control of the heater control elements 40-42-44, keeps the circulating sample close to the desired control temperature, to insure accurate measurements at the analysis units 14 and 16.

When (following a number of sample admissions through valve 30) the desired concentration is reached, the refractometer, heater and the timer relays 78, 80, 90 and 92, prevent resumption of the timer motor 19 until the solution temperature in the system passes through the control point (viz., 50°C), either on increase or decrease of the temperature of the circulating sample. At this point, the circulating sample is at the desired optimum conditions for an automatic purity readout, as hereinafter described.

Thermal Equilibrium

As previously noted, resumption of the timer action causes rotation of the cam 62 to de-energize switch 81. As a result, no further inflow of sample occurs through valve 30, nor flow of cooling water through valve 38 to circulatory cooler 36. The shifting of switch 64 to contact 66 also prevents introduction of cooling water to the cooler 32. In these conditions, the temperature of the sample circulating in the flow system 10 is maintained solely by the heater control unit 44, through operations of the sensor 42 and heating element 40, to make up heat loss by convection or otherwise.

It follows, during the period for purity analysis and automatic readout, that the temperature of the circulating sample can be maintained within a very narrow range, as respects the control temperature. Thus, by way of illustration, in the case of a dilute sugar factory sample to be analyzed at 50°C, the heater control unit is effective to maintain the temperature of the circulating sample to within $\pm 0.05°$ C of this temperature. Accordingly, when the timer 19 functions through additional cam switches (not shown) to initiate an automatic purity readout at the computer-recorder 22, the circulatory sample is substantially at the selected control temperature and the optical surface of the refractometer 14 and polarimeter 16 are in thermal equilibrium with the sample.

Estimation of Total Solids Concentration

While the measurement or estimation of dissolved solids may be based on either the density or the refractive index of the circulating sample, as a practical matter, available densometric apparatus has been found to be subject to analysis errors in the presence of entrained solids or gases (i.e., the apparatus responds to total mass rather than dissolved solids). Accordingly, since refractometric devices operating on the critical-angle principle are entirely immune to entrainment errors, refractometric analysis for dissolved solids is considered generally more accurate, and is preferred for use in the present invention. However, to the extent that densometric apparatus might be employed to produce an electrical analog output truly proportional to the concentration of dissolved solids, densometric means might be substituted for the refractometric means employed in the purity analysis, as hereinafter described.

The particular refractometric apparatus employed in the present invention may be selected from any commercially available equipment (i.e., of the automatic on-stream type) suitable for the purpose. Such apparatus generally responds to measurement of a critical angle of light incident on a thin film of sample liquid moving in contact with a prism of known refractive index and known angle. The apparatus generally functions to measure the refractive index (and concentration) of the sample in contact with its prism. One satisfactory refractometer for automatic on-stream analysis (Model SSR-70, manufactured by the Electron-Machine Corporation, Umatilla, Florida) provides an electrical analog or output in the form of a direct current which is proportional to the refractive index of the sample undergoing test. As used in the system of apparatus described and illustrated in FIG. 1, the refractometer is calibrated so that (at a temperature of 50°C) the output current is zero with distilled water, and 1 milliampere when the solution film on the prism contains 25 percent sucrose. When energized by the relay logic 20, the refractometer 14 delivers an electrical analog to the computer-recorder 22, which is proportional to the concentration of total dissolved solids in the sample circulating in contact with its prism.

Partial Sucrose Concentration

Automatic, on-stream estimation or measurement of sucrose in process streams, such as cane and beet factory juices, is presently possible only through polarimetric measurement of the amount of rotation of plane-polarized light passing through the solution. In such measurements, the rotation of the light in degrees of arc is proportional to the length of the light path through the solution, and to the concentration of sucrose in the solution (viz., grams per 100 ml). The extent of such rotation is a function of the wavelength of the illuminant and the specific rotation of the liquid or solute.

As a practical matter, purity (i.e., the ratio sucrose to total solids) is practically unaffected by changes in concentration. However, other factors dictate that each process stream be diluted to a concentration which optimizes analysis accuracy. These factors include the necessity of proper light transmission through the sample cell, sufficient cell length to insure proper scavenging of the cell space between measurements, and practical limitations imposed by many commercially available units on the extent of light rotation. In the case of concentrated process liquids, such as cane and beet factory juices, it has been found that dilution to within a range of about 10° to about 25° Brix will provide desired analysis accuracy. Within this range, the maximum light rotation in a polarimeter with a 5 ml cell length, for example, will remain within the range of about 1° arc and the optical density of the solution will not exceed about 1.0, thus insuring polarimetric measurements of specified accuracy. Since it is appropriate to arbitrarily select a level of concentration for analysis control, it has been demonstrated that only two levels of concentration are required for optimum analysis accuracy, specifically 11° and 22° Brix. Accordingly, in the illustrated apparatus, provision is made for automatic control of sample concentration at either of these levels.

A further advantage obtained by sample dilution is that refractometric measurements with use of critical-angle type refractometers, such as the unit 14, become practical and advantageous, primarily due to more efficient purging of the sample space and elimination of scaling on the prism at the diluted concentration.

Automatic, on-stream polarimetric apparatus for use in the present invention may likewise be selected from commercially available equipment. A particularly satisfactory polarimeter (Bendix, Series 1100, as distributed by the Bendix Scientific and Equipment Division of Bendix Corporation, Rochester, New York) provides an output in the form of a direct current, with the direction of current flow reversing when the optical rotation of the sample changes from positive to negative, or vice versa. By modification to provide a negative current flow in the absence of optically active material (distilled water), and to suppress the negative output from the load resistor, the apparatus can be made to accommodate optical rotations within the range from 0° to +1°. To additionally make possible the computing of a purity value on a slidewire type potentiometric circuit at the computer-recorder 22 (see FIG. 4), it is necessary that the polarimeter 16 provide a potential which is proportional to the optical rotation of the sample. Modifications for this purpose are specifically shown in FIG. 3.

Figure 3:
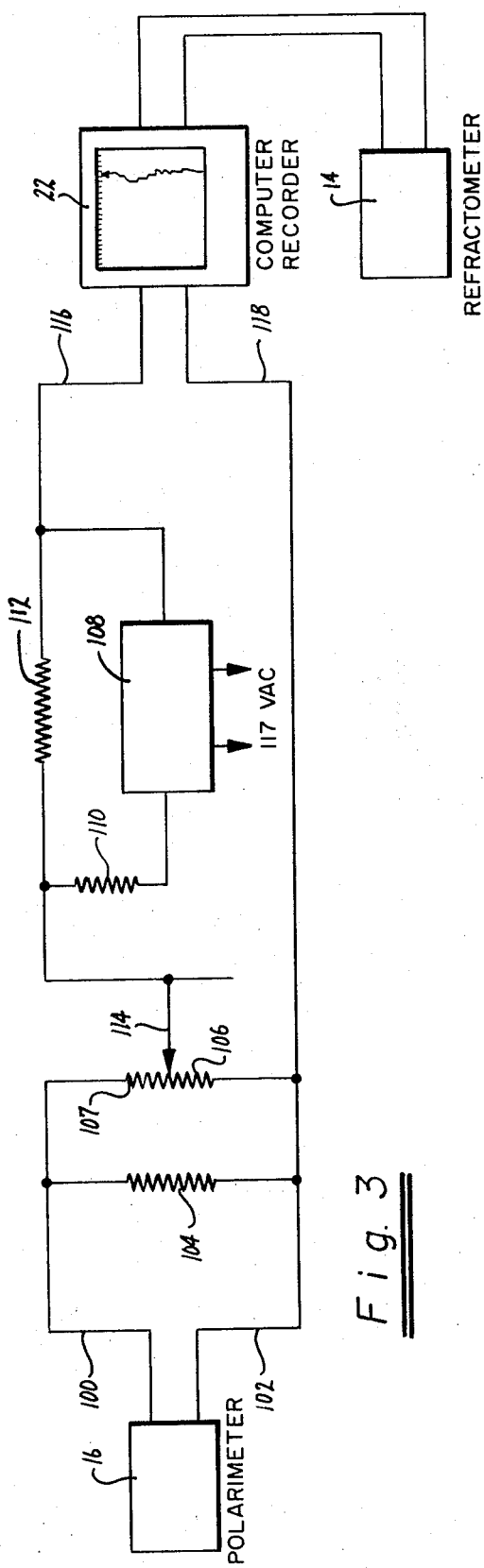
FIG. 3 is a schematic representation of a polarimeter interface circuit useful in the apparatus of FIG. 1.

Polarimetric apparatus of the type described generally includes an optional external readout device. The circuit of FIG. 3 is substituted for this optional device, and functions to provide a polarimetric output to the computer-recorder 22 which increases from zero in proportion to the optical rotation measured at the polarimeter. Specifically, as illustrated in FIG. 3, line 100 is connected to the coil (i.e., compensator Faraday cells of the polarimeter), whereas line 102 represents the connection to ground. Resistance 104 is a load resistor (e.g., 3 ohms) which may be shunted by a multiple turn potentiometer 106 (e.g., 500 ohm, 10-turn). The latter serves for adjustment of the output voltage to match a voltage developed across a slidewire in the purity analyzer circuit (FIG. 4), by current from the refractometer 14 when the apparatus contains solutions of pure sucrose. The potential to point 107 of the potentiometer, with respect to ground, swings from negative to positive with sample concentrations within the desired range (i.e., 0 to 25 grams per 100 ml). Component 108 represents a commercially available unit to provide a constant voltage output when loaded with a specified resistance. In the circuit of FIG. 3, the component 108 may be a Honeywell constant voltage unit (No. 365389–1) or similar device, to provide a constant output voltage of 1.029 volts DC when loaded with a resistance of 171.5 ohms. The resistances 110 and 112 in the circuit add up to this specified load and act as a voltage divider. Thus resistance 112 is designed to develop a voltage drop which equals the voltage developed between the slider 114 and the ground 102, when the apparatus is filled with water. Accordingly, being connected in opposition, the two voltages exactly cancel so that the potential between the leads 116 and 118 (to the computer-recorder 22) is zero, in the absence of optically active material in the polarimeter light path. The net effect, therefore, is that the output potential (116 to 118) will increase in proportion to the sucrose concentration or optical rotation, produced by the sample flowing through the polarimeter 16. As in the case of the refractometer, this electrical analog is supplied to the computer-recorder 22.

Purity Analysis and Readout

At the completion of the preceding operations (wherein the system operates to prepare a circulating sample of known solids concentration, and to bring the temperature of the circulating sample to within a relatively narrow range as a predetermined control temperature), the program timer 18 actuates the computer-recorder 22 for a relatively short period of time (e.g., 5 seconds or less) to compute, display and record the purity of the sample. Thus, in a preferred operation of the apparatus, the computer-recorder holds the display for visual observation during a repeat of the described operations to purge the circulatory system 10, to prepare the dilute circulating sample, and to bring the sample and optical surfaces to the point of temperature equilibrium.

Figure 4:
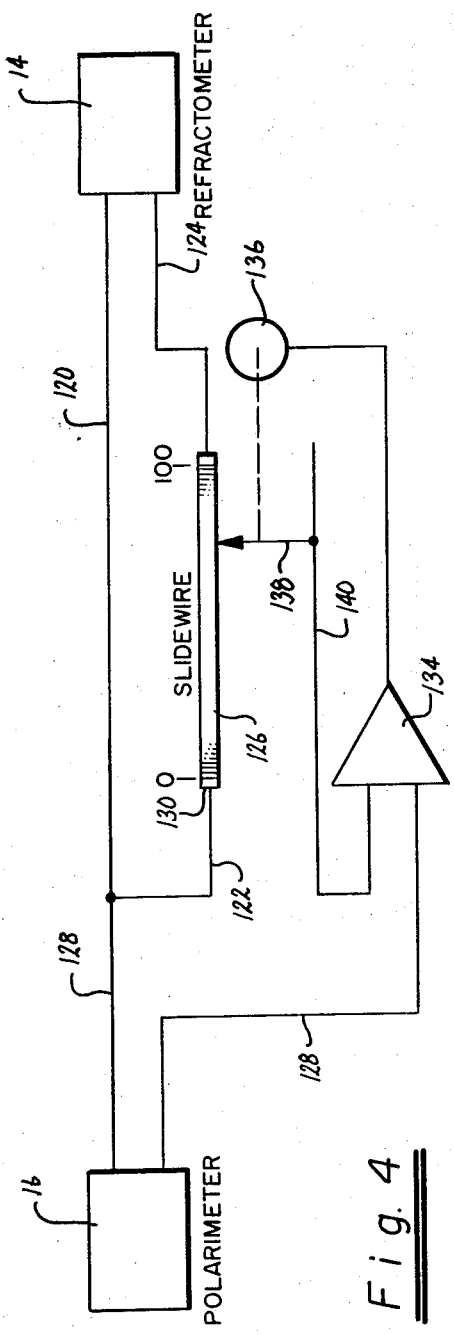
FIG. 4 is a schematic representation of a slidewire type potentiometer circuit for presenting a purity indication at the computer-recorder of FIG. 1.

The computing and display of the purity value is accomplished by means of a slidewire potentiometer circuit, as illustrated in FIG. 4. With reference to this figure, the output from the refractometer 14 is a current which is applied through lines 120, 122 and 124 to the slidewire 126 (conveniently provided with equally spaced markings covering a range from 0 to 100). In general, the output of the refractometer is proportional to $n-n_o$, wherein $n$ is the index of refraction of the sample and $n_o$ is that of pure water. More specifically, the output of the refractometer is the electrical analog of the concentration of all dissolved solids in the sample liquid circulating in the system 10. The potential developed across the slidewire 126 is therefore proportional to and a measure of the total solids in solution.

Referring again to FIG. 4, the electrical output from the polarimeter 16 is also a potential, and is supplied through lines 128 and 122 to the zero end 130 of the slidewire and through line 132 to one side of a servo amplifier 234. The amplifier 134 drives a servo motor 136 which is mechanically connected to a movable contact 138 on the slidewire, as represented by the dotted line 140. The electrical connection from the movable contact 138 to the polarimeter is completed by the line 140 to the servo amplifier 134. As previously noted, the output of the polarimeter is the electrical analog of the sucrose concentration. More specifically, the analog output of the polarimeter is proportional to $\alpha$, the angle of rotation induced by the sucrose and other optically active substances in the circulating sample.

As noted previously, "purity is the ratio of dissolved sucrose to total solids in the circulating sample." Purity as determined by the illustrated apparatus may therefore be defined as follows:

$$P = k_2\alpha/k_1(n-n_o)$$

wherein $k_1$ and $k_2$ are conversion constants. The potential or electrical output of the polarimeter ($E_p$) may thus be expressed:

$E_p = k_2\alpha$. Accordingly, by a proper choice of connections, the movable contact can be driven by the servo amplifier 134 and motor 136 to a point on the slidewire 126 where the potential $E_p$ equals the potential existing between the zero end 130 of the slidewire and the point of contact. Since the scale of the slidewire 126 is subdivided equally over a range from 0 to 100, the null position of the movable contact 138 registers or indicates the ratio of the polarimetric and refractometric output potentials, as measured by the units 14 and 16. It will be appreciated that this ratio is the quantity of interest, specifically, the purity of the sample, and that the pointer thus reads the purity of the sample in terms of percent.

As illustrated in FIG. 1, the computer-recorder 22 represents a potentiometric recorder including the slidewire circuits of FIGS. 3 and 4. Except for these indicated modifications, the unit 22 may comprise any standard potentiometric recorder adapted to pen recording on a strip chart, as generally represented at 23. Since most industrial applications will benefit from purity analyses of a series of process streams, the computer-recorder unit preferably comprises a multi-point recorder, with facilities cooperating with a programmed selection of samples to be introduced through the various sample lines and valves 30, and for automatic printout of successive purity analyses by separate identifying symbols. In general, the period for multistream analyses will depend upon the number of separate process streams to be analyzed and the program cycle for analysis of each separate process stream.

As a practical matter, the described apparatus makes possible the rapid, selective purity analysis of sucrose containing process streams in a relatively short period of time, as respects each individual analysis. By way of illustration, the time required for drain, flush and water fill of the circulatory system 10, under control of the program timer 18, will vary within the range from about three-fourths to 1 minute, a typical cycle requiring about 55 seconds. The period required to prepare a sample of known desired sucrose concentration, under control of the relay logic 20, will vary within a range from about 1 to 2 minutes, a typical cycle requiring about 75 seconds. The time required to reach thermal equilibrium (following restart of the program timer) may be arbitrarily selected to fall within the range from about one-half to 1 minute, with a typical period being of the order of 45 seconds. Only a very short period of, say, 3 to 5 seconds is required for the automatic computing and readout at the unit 22. As a practical matter therefore, a cycle of analysis for a particular sample introduced to the illustrated apparatus will require no more than about 3 to 5 minutes to complete, and will be performed on an entirely automatic basis.

It will be apparent from the above description, therefore, that a highly effective, comparatively foolproof method and means has been devised for rapidly and selectively determining the purity of multiple process streams containing sucrose. Particular advantages include the ability to carry out the analyses at substantially higher tempersatures than possible with previous techniques, and with elimination of the lead clarification and filtration steps employed in conventional analysis procedures. The described system also provides many practical advantages in that separate process streams can be brought to the apparatus through piping, following which the purity analyses can be performed and recorded automatically and at desired intervals with respect to each process stream. The apparatus further performs the operations, following each analysis, of discharging the sample and providing a hot water rinse to clean the components of the apparatus contacted by the sample material. Of particular importance is the fact that the analyses are made essentially without human attention, so that sample preparation, analysis, computation and recording steps are accomplished without opportunity for human error, while providing substantial increases in processing accuracies and corresponding reductions in analysis costs. It has been further demonstrated that the improved analysis method and means of the invention is adaptable to a wide variety of plant operations, permitting a maximum efficient utilization of the same in various commercial and industrial applications. The foregoing and other advantages are clearly within the scope of the invention as herein described and claimed.

I claim:

1. In a method for rapidly determining the purity of multiple process streams in the form of solutions containing dissolved sucrose and other solids with a high degree of reproducible accuracy, the steps of mixing a portion of a selected process stream with water in a closed circulatory system to form a diluted sample, progressively adding additional portions of the process stream to provide a sample of increasing solids concentration, discontinuing the addition of said process stream at such time as the sample achieves a predetermined desired solids concentration, controlling the temperature of said sample to within a predetermined range as respects a particular, desired control temperature, causing the temperature of said sample to oscillate within said predetermined range so as to repeatedly pass through said control temperature, measuring said sample to obtain simultaneous refractometric and polarimetric electrical signals which are proportional, respectively, to the total concentration of solids and the partial concentration of sucrose dissolved in said sample, and converting said electrical signals only at such time as the sample is both at said predetermined desired solids concentration and said predetermined control temperature to an electrical purity readout representing the proportion of dissolved sucrose to total solids.

2. A method as in claim 1 including the step of circulating said sample within said closed circulatory system to effect thermal equilibrium between said sample and optical surfaces involved in said refractometric and polarimetric measurements to obtain said electrical purity readout.

3. A method as in claim 1 including the steps of introducing said process streams into said closed circulatory system for the purpose of determining individual sample purity readings, and intermittently draining and washing the closed circulatory system to purge traces of prior process streams between each separate purity determination.

4. In a method for rapidly and selectively determining the purity of process streams containing dissolved sucrose and other solids with a high degree of reproducible accuracy, the steps of forming a generally closed circulatory system, substantially filling said generally closed circulatory system with water, progressively introducing portions of a selected process stream to said closed circulatory system to produce a dilute circulatory sample of progressively increasing solids concentration, controlling the temperature of the sample circulating within said closed circulatory system whereby the sample temperature oscillates through a point of temperature control within a predetermined relatively narrow temperature range, sensing the sucrose concentration of said circulating sample by means of a polarimeter to generate a polarimetric electrical signal proportional to the sucrose concentration of said sample, sensing the total solids concentration of said circulating sample by means of a refractometer to generate a refractometric electrical signal proportional to the total solids concentration of said sample, interrupting the progressive introductions of said process stream to said circulating sample in response to a predetermined desired solids concentration sensed by said refractometer, and causing the proportional electric signals generated by said polarimeter and refractometer to be converted to a sucrose purity ratio in response to a subsequent oscillation of said sample temperature through said control point.

5. A method as in claim 4 including the steps of draining and flushing said generally closed circulatory system with water to purge all traces of previous samples, prior to forming said dilute circulatory sample.

6. A method as in claim 4 including the step of controlling said predetermined relatively narrow temperature range to within + or −1°C., of said point of temperature control.

7. A method as in claim 4 including the step of controlling said predetermined relatively narrow temperature range to within +0.05 or −0.05 of said point of temperature control.

8. A process as in claim 4 including the step of maintaining said point of temperature control at a temperature of the order of 50°C.

9. A method as in claim 4 including the step of controlling the temperature of the circulating sample by heat exchange.

10. A method as in claim 8 including the step of controlling the temperature of said circulating sample in part by heat exchange and in part by the inlet temperature of said selected process stream.

11. A method as in claim 4 wherein said predetermined solids concentration is an arbitrarily determined value within the range from about 10° to no more than about 25° Brix.

12. A method as in claim 4 wherein said proportional electrical signals are converted to said sucrose purity ratio by arbitrarily adjusting said refractometric electrical signal to a scale from 0 to 100, and subsequently adjusting said polarimetric electrical signal to a null position with respect to 0 on the same scale, thereby providing a sucrose purity ratio in terms of percentage.

13. A method as in claim 4 wherein the steps to determine the sucrose purity ratio for a particular process stream are accomplished within a period of about 3 to no more than 5 minutes.

14. A method as in claim 4 wherein the steps to obtain a sucrose purity ratio are selectively accomplished with respect to each of several successive process streams at approximately 3 to 5 minute intervals.

15. In a system of apparatus for rapidly and selectively determining the purity of multiple streams containing dissolved sucrose and other solids with a high degree of reproducible accuracy, means forming a closed circulatory system, pump means to circulate liquid through said closed circulatory system, means controlling the temperature of liquid circulating in said closed circulatory system with respect to a predetermined control temperature, refractometric means in said closed circulatory system to provide an electrical signal proportional to the concentration of total solids in liquids circulating in said closed circulatory system, polarimetric means in said closed circulatory system to provide an electric signal proportional to the concentration of sucrose in liquids circulating in said closed circulatory system, indicating means responsive to the electrical signals from said refractometric and polarimetric means to indicate the ratio of sucrose to total solids concentration in said circulating liquids, valve means for introducing substantially pure water to said closed circulatory system, separate valve means for selectively introducing portions of a selected sucrose containing process stream to said circulatory system, means controlling the operation of said respective valve means whereby a sample of progressively increasing solids concentration is caused to circulate within said closed circulatory system, means responsive to a particular predetermined solids concentration of liquids circulating in said closed circulatory system to close said separate valve means, and means responsive to the temperature of liquids circulating in said closed circulatory system only at said predetermined control temperature to actuate said indicating means.

16. Apparatus as in claim 15 wherein said means forming the closed circulatory system include a sample preparation tank and conduit means in fluid communication with said refractometric and said polarimetric means.

17. Apparatus as in claim 16 including float means in said sample preparation tank to control the valve means introducing substantially pure water to said closed circulatory system.

18. Apparatus as in claim 16 wherein said means controlling the temperature of liquids circulating in said closed circulatory system include heating means within said sample preparation tank and temperature control means therefor.

19. Apparatus as in claim 15 wherein said means controlling the temperature of liquids circulating in said closed circulatory system include heat exchange means operable to control the temperature of process materials introduced to and circulating within said closed circulatory system.

20. Apparatus as in claim 15 wherein the temperature of liquids circulating in said closed circulatory system is controlled within predetermined limits above and below a predetermined control temperature by means of relay logic controlling means, said last named means controlling cooling means in communication with said closed circulatory system to effect temperature reductions and likewise said separate valve means for introducing relatively hot sucrose containing process streams to thereby effect temperature increases, whereby the temperature of said circulating liquid is caused to oscillate within said predetermined limits and through said control temperature.

21. Apparatus as in claim 15 wherein said indicating means includes a slidewire having a potential equal to the proportional output of said refractometric means and a contact movable on said slidewire to a null position at a potential equal to the proportional output of said polarimetric means.

22. Apparatus as in claim 21 wherein said slidewire is subdivided over a range of 0 to 100, whereby the null position of the contact indicates the concentration of sucrose determined by the polarimetric means as a percentage proportion with respect to the total solids as determined by the refractometric means.

23. Apparatus as in claim 15 wherein said indicating means operates only on closing of said separate valve means to prevent further introductions of a selected sucrose containing process stream, whereby said means actuating the purity ratio indicating means is responsive to said predetermined control temperature only at a predetermined control temperature and solids concentration of said circulating sample.

24. Apparatus for rapid, selective highly accurate purity analyses of process streams containing dissolved sucrose and other solids comprising: a sample preparation tank, conduit means forming a closed circulatory system in fluid communication with said preparation tank, means introducing substantially pure water to said closed circulatory system, means introducing portions of a selected sucrose containing process stream to said closed circulatory system, means controlling the temperature of liquid circulating in said closed circulatory system, said temperature control means including means to cause the temperature of said circulating liquids to oscillate between upper and lower limits with respect to a predetermined control temperature, means controlling the proportion of sucrose containing process streams introduced to said system whereby a sample of progressively increasing solids concentration is caused to circulate in said system, polarimetric means to measure the sucrose concentration of said liquid circulating in said closed system, refractometric means measuring the concentration of total solids in said liquid circulating in said closed system, control means associated with said refractometric means to interrupt the means controlling the introduction of sucrose containing process stream to said closed system at a predetermined solids concentration, and means converting measurements from said polarimetric and refractometric means to an indication of the proportion of sucrose to total solids in the sample circulating in said closed system, said last named conversion means operable only at such time as the refractometric means has interrupted said means introducing sucrose containing process stream and said temperature control means has caused the temperature of said circulating sample to pass through said predetermined control temperature, whereby highly accurate purity readings representing the ratio of dissolved sucrose to total solids are obtained only with respect to a circulatory sample of predetermined temperature and solids concentration.

* * * * *